May 23, 1961  C. J. WISE  2,985,200
WIRE SPLICING TOOL FOR REPAIRING FENCES
Filed Nov. 24, 1959  2 Sheets-Sheet 1
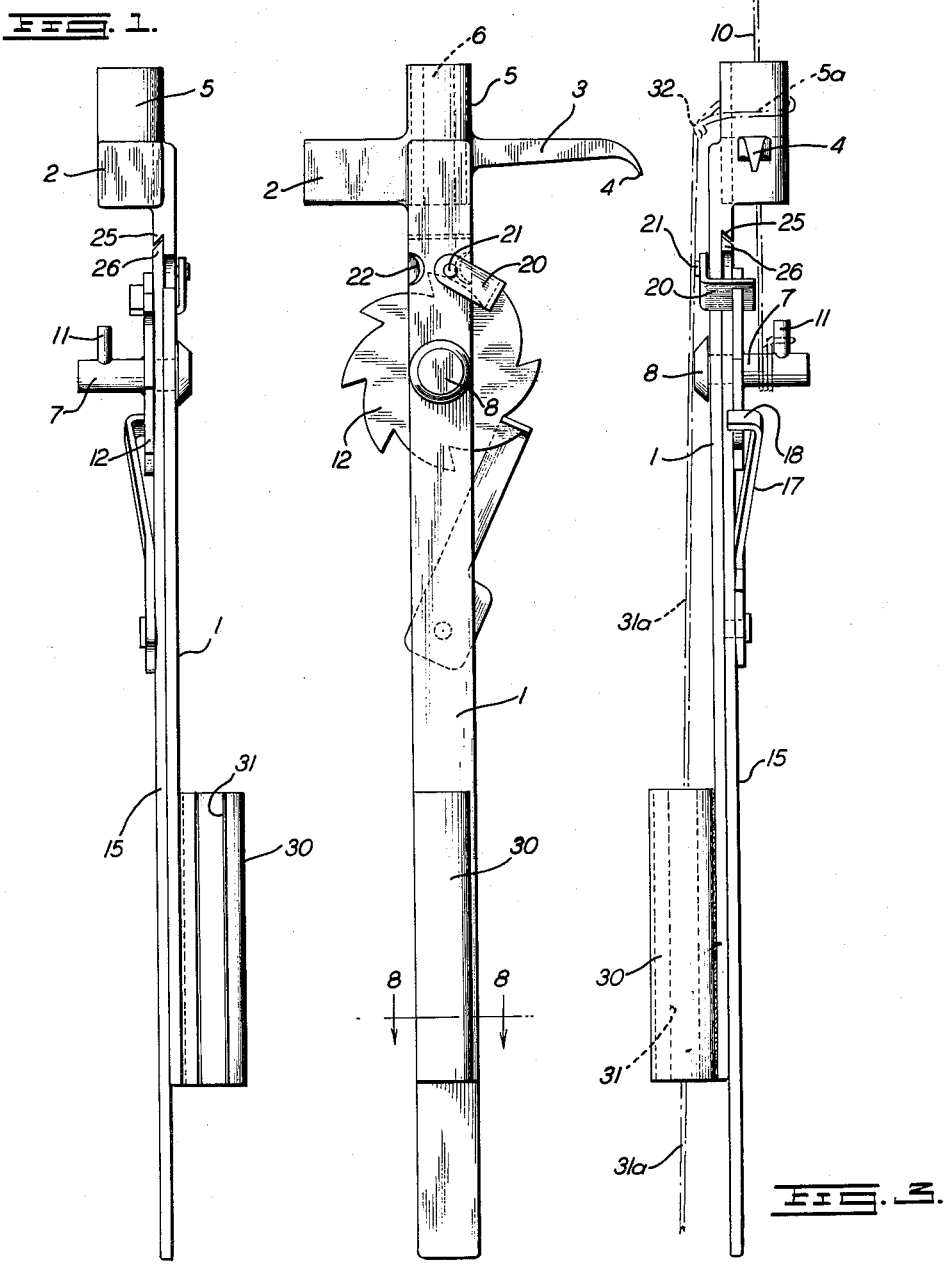
INVENTOR.
COY J. WISE
BY Ralph T. Bassett
ATTORNEY

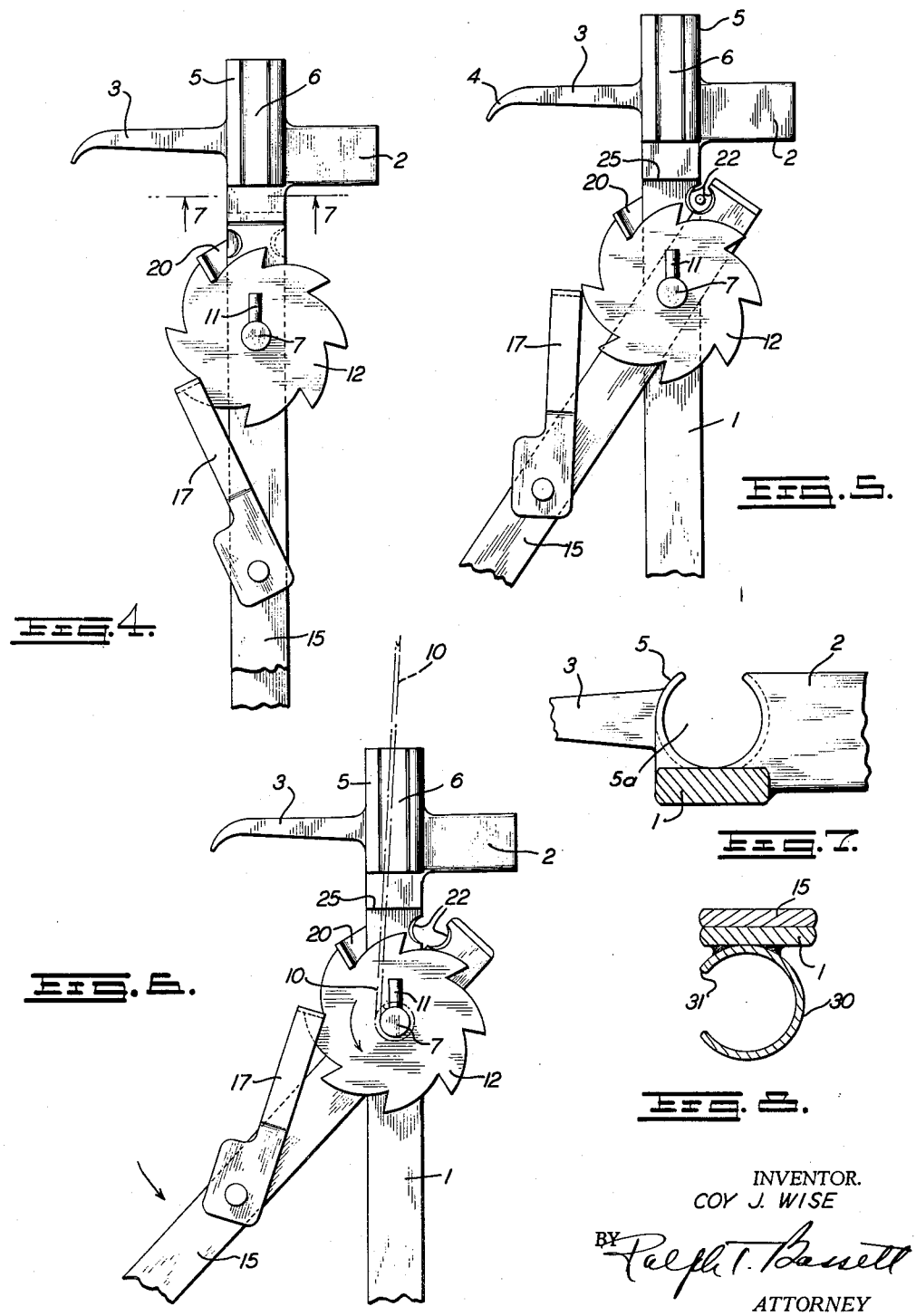

United States Patent Office 2,985,200
Patented May 23, 1961

2,985,200
WIRE SPLICING TOOL FOR REPAIRING FENCES
Coy J. Wise, R.R. 2, Box 159C, Vale, Oreg.
Filed Nov. 24, 1959, Ser. No. 855,216
3 Claims. (Cl. 140—118)

This invention relates to a fence repairing tool and particularly to that type of tool designed for splicing the broken ends of barbed wire fencing.

The main object of the invention is to provide a tool which embodies elements for performing all essential steps which may be necessary when slicing the adjacent ends of barbed wire fencing, including means for driving and pulling staples, means for connecting the broken ends of the wire prior to splicing, and means for tightening the fencing and for permitting the joining of the ends of the wires.

Another object of the invention is to provide a tool embodying the characteristics mentioned and in which there are no small, breakable or loose parts, such as springs and similar elements, which might become broken or detached during the heavy duty to which a tool of this type might be subjected.

These and other objects of the invention will more clearly hereinafter appear by reference to the accompanying drawings forming a part of the instant specification, and wherein like characters of reference designate corresponding parts throughout the several views, in which:

Fig. 1 is a side elevation showing one side of the tool;
Fig. 2 is a top plan view;
Fig. 3 is a side elevation showing the opposite side of the tool from Fig. 1;
Fig. 4 is a view showing the wire reel and ratchet assembly with the actuating pawls associated therewith;
Fig. 5 is a similar view showing the operating lever positioned to place the operating pawls in working position to tighten the wire extremities illustrated;
Fig. 6 is a similar view to Fig. 5 showing the pawls in position with the wire on the spool being tightened;
Fig. 7 is a fragmentary section taken on line 7—7 of Fig. 4 and illustrating the top end of the hammer and the wire guide;
Fig. 8 is a section on line 8—8 of Fig. 2; and
Fig. 9 is a view showing the wire connection after the parts are joined.

The present device comprises two parts, the first part embodying an elongated flat handle 1, the upper extremity of which is formed with the hammer head 2 and the staple puller claw 3 projecting laterally therefrom. The staple puller 3 has the usual tapered inwardly hooked extremity 4 for insertion beneath a driven staple for applying leverage thereto to lift it from the wood in which it may be embedded. Projecting from and aligned with the handle is an annular, generally cylindrical hollow terminal portion or post 5 having a longitudinally extending slot 6 formed therein for the passage therethrough of one end portion of a strand of wire, which strand of wire is adapted to be wrapped about a spool or reel 7 which projects through the handle 1 and is headed at 8. The spool or reel 7 is of annular form and has a sufficiently elongated body to permit the wrapping of the wire terminal 10 thereabout.

A transverse stud 11 projects from the outer end of the reel 7 to use as a binding post for securing the terminal of wire 10 thereon. The spool or reel 7 can be rotated by the ratchet wheel 12 fixedly mounted thereon and spaced from the inner adjacent wall of the handle 1. The post 5 has its axial bore $5^a$ aligned for the passage of wire to the spool or reel 7.

The second part includes a handle 15 which is pivotally associated with the first handle 1 by being pivotally mounted on the spool 7 between the handle 1 and the ratchet wheel 12. This handle 15 includes an operating pawl 17 having the laterally projecting terminal 18 which engages the teeth of the ratchet so that when handle 15 is actuated, the pawl 17 will engage a tooth of the ratchet wheel 12 and rotate the spool or reel 7. A locking pawl for the reel 7 is provided at 20, this pawl being pivoted at 21 to the handle 1 at the upper portion of the ratchet wheel 12 and normally is arranged to lock the spool or reel 7 against backward rotation when the actuating pawl 17 is released from engagement whereby a step by step cyclic movement of the ratchet will be effected by successive strokes of the handle 15 toward and away from handle 1.

Each of the handles 1 and 15 is provided with an arcuate recess defining a cutting edge or face 22 adjacent the upper end portion of the handle 15, these cutting faces 22 being adapted to cooperate when the handles are relatively moved on their pivotal mounting to function as wire cutters as illustrated. In addition, there is a transverse angular recess 25 formed in the handle 1 above the cutting faces 22 to receive the beveled transverse extremity 26 of the handle 15 to form a guideway for retaining the handles 1 and 15 parallel during application of forces in the several operations which may be performed by the assembly.

On the outer face of handle 1, near its lower end portion, is fixed a hand protector and wire guide 30 in the form of an elongated cylinder having a longitudinally extending side slot 31 for the insertion of one extremity of the wire being joined and permitting handling of the tool without the hand becoming injured by the barbs on the wire. As shown in Fig. 3 one extremity of the wire $31^a$ will extend through this hand protector and wire guide 30 and lengthwise of the handle 1 for wrapping about the post 5 where this wire is then rewound about itself, as shown at 32. A second wire terminal shown at 10 extends through the hollow post 5 and therefore through the loop 32 in the first wire $31^a$ and is wrapped about the spool or reel 7. With the wire terminals in the positions shown, the tightener can be actuated, i.e., the handle 15 carrying the pawl 17 can be actuated to rotate the spool 7 to tighten the strand of wire 10. When this strand of wire is tightened the hand protector and wire guide 30 carried on the handle 1 is disengaged from the shank of the wire $31^a$ and the device is reversed in direction. After the device is reversed in direction, the post 5 should be pulled out of the loop 32 in the wire $31^a$, thus leaving wire 10 extending through the loop 32 in wire $31^a$. The terminal of the wire 10 can then be wrapped about wire $31^a$ to form a splice between the wires and subsequently the ratchet wheel 12 can be released. This operation will result in a wire connection of the form shown in Fig. 9.

It will be noted that the longitudinal side slot 31 in the hand protector and wire guide 30 will be positioned at the lower side face of the hand protector and wire guide 30 during operation of the tool.

It will be noted that when the present assembly is initially positioned and connected with the broken ends of the wire, the assembly lies in the direction and generally in the plane of and substantially axially of the normal position of the wire ends when connected. This enables tensioning of the strands of wire in the direction of the normal length, thus eliminating any deformation of the wire structure which might cause slack which would appear after the splicing operation.

What I claim is:

1. In a wire splicing tool for fencing, a first member having a hollow post at one end extending in the direction of the length of said first member, said hollow post being formed with a longitudinally extending slot throughout its length and at its outer face, a reel member having an actuating ratchet wheel rotatably mounted on said first member below said post, said reel member including a projecting spool body extending laterally of said first member and immediately below said hollow post, a second member including a handle pivotally mounted on said spool body, said second member having a ratchet actuating pawl mounted thereon for rotating said reel member, and a tubular hand protector and guide mounted on said first member below the reel and at the opposite side from said ratchet.

2. The structure of claim 1 characterized in that the tubular hand protector and guide is formed with a longitudinal slot positioned generally at 90 degrees from a slot in the hollow post.

3. The structure of claim 1 characterized in that the reel which forms the pivot for the two handles is provided with a projection for securing a wire terminal.

References Cited in the file of this patent

UNITED STATES PATENTS

| | | |
|---|---|---|
| 1,675,476 | West | July 3, 1928 |
| 2,451,933 | England | Oct. 19, 1948 |
| 2,494,963 | Ray | Jan. 17, 1950 |